United States Patent Office 3,108,039
Patented Oct. 22, 1963

3,108,039
INSECT REPELLENT COMPOSITIONS HAVING EXTENDED REPELLENT LIFE
Donald E. Carr, Bartlesville, Okla., assignor to Phillips Petroleum Company, a corporation of Delaware
No Drawing. Filed Dec. 3, 1959, Ser. No. 856,932
7 Claims. (Cl. 167—33)

This invention relates to insect repellents. In one aspect this invention relates to insect repellent compositions wherein the repellent life of the repellent ingredient is greatly extended. In another aspect the invention relates to a method for greatly extending the repellent life of certain insect repellents.

In man's continuing battle against insects, the use of repellents plays an increasing important role. Although insecticides have been used for many years to combat insects, the use of insect repellents to combat insects has received a great deal of attention in recent years. It is particular preferable to repel rather than to kill insects such as flies and roaches which are known to be notorious carriers of disease. Insect repellents have been discovered recently which are particularly effective in repelling flies and roaches, such as the dialkyl esters of pyridine dicarboxylic acids, polycyclic aldehydes, polycyclic alcohols, and various sulfoxide compositions. In U.S. Patent 2,884,355 it is disclosed that N-alkyl imides of bicyclo-[2.2.1]-5-heptene-2,3-dicarboxylic acid, the alkyl 3-(3,4-methylenedioxybenzene) propyl sulfoxides and certain substituted methylenedioxybenzenes greatly extend the repellent life of dialkyl esters of pyridine dicarboxylic acids.

It is disclosed in copending application Serial No. 467,882, of L. D. Goodhue et al., filed November 9, 1954, now abandoned, that certain polycyclic compounds prepared by the reaction of one mole of furfural with two mols of butadiene are synergized by combination with N-alkyl imides of bicyclo[2.2.1]-5-heptene-2,3-dicarboxylic acid. It is also disclosed in U.S. Patent 2,884,355 that the repellent life of dialkyl esters of pyridine dicarboxylic acids is greatly extended by incorporating therewith certain organic synergists.

It is a principal object of this invention to provide new insect repellent compositions of extremely long effective repellent life.

It is also an object of this invention to provide a method for greatly extending the repellent life of certain insect repellents.

Another object of this invention is to provide an insect repellent composition having a repellent life sufficiently long so that packages employed by manufacturers will be repellent to insects for the normal length of time required for transportation, vending and consuming the products therein.

It is now discovered that compositions containing certain insect repellents such as a polycyclic aldehyde or alcohol, a stabilizer or synergist such as an N-alkyl bicyclo[2.2.1]-5-heptene - 2,3 - dicarboximide and a finely divided inorganic material such as silica gel are very effective repellents, particularly for roaches, and have an extremely long repellent life.

The terminology "polycyclic aldehyde and alcohol" as used herein is intended to include compounds of the formulas

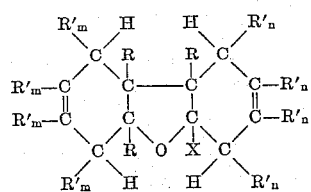

and

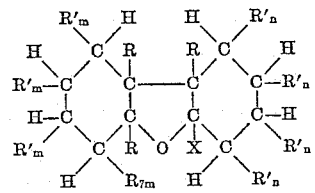

wherein X is selected from the group consisting of

and

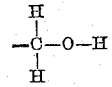

R is selected from the group consisting of hydrogen and methyl, wherein at least one R is hydrogen, wherein each R′ is a radical selected from the group consisting of hydrogen and alkyl radicals containing not more than 3 carbon atoms, wherein the sum of the carbon atoms in the $R'_n$ and $R'_m$ radicals is in each case not greater than 3, and wherein at least two of the $R'_m$ and at least two of the $R'_n$ radicals are hydrogen.

Some examples of compounds of the above general formulas which can be employed are: 2,3,4,5-bis($\Delta^2$-butenylene)tetrahydrofurfural; 2,3,4,5-bis($\Delta^2$-butenylene)-tetrahydrofurfuryl alcohol; 2,3,4,5-bis(butylene)tetrahydrofurfural; 2,3,4,5,-bis(butylene)tetrahydrofurfuryl alcohol; 2,3,4,5-bis($\Delta^2$-2-methylbutenylene)tetrahydrofurfural; 2,3,4,5 - bis(2,3 - dimethylbutylene)tetrahydrofurfural; 2,3,4,5-bis(2-ethylbutylene)tetrahydrofurfural; 2,3-($\Delta^2$ - methylbutenylene) - 4,5 - ($\Delta^2$ - 2 - ethylbutenylene)-tetrahydrofurfural; 2,3 - (2,3 - dimethylbutylene)-4,5-(2-methylbutylene)tetrahydrofurfural; 2,3,4,5-bis($\Delta^2$-2-methylbutenylene)tetrahydrofurfuryl alcohol; 2,3,4,5-bis(2-ethylbutylene)tetrahydrofurfuryl alcohol and 2,3-($\Delta^2$-butenylene) - 4,5 - ($\Delta^2$ - 2 - methylbutenylene)tetrahydrofurfuryl alcohol.

Methods for preparing these compounds are set forth in detail in U.S. Patents 2,683,151; 2,687,419 and 2,795,592.

The N-alkyl bicyclo[2.2.1]-5-heptene-2,3-dicarboximides which can be employed in the insect repellent compositions of this invention are represented by the formula

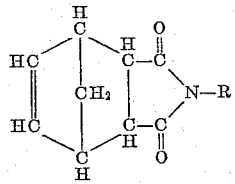

wherein R is an alkyl radical containing from 1 to 12 carbon atoms, preferably from 4 to 10 carbon atoms. While the most preferred compound is when R is 2-ethylhexyl, other imides wherein R is, for example, methyl, ethyl, n-propyl, tert-butyl, isohexyl, n-octyl, sec-decyl and tert-dodecyl, are within the scope of this invention.

Other materials which have shown a synergistic effect in prolonging the repellent life of certain repellents are the sulfoxide of isosafrole, represented by the formula

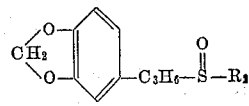

wherein $R_2$ is an alkyl radical containing from 2 to 12 carbon atoms; and substituted methylenedioxybenzenes, represented by the formula

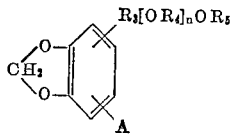

where A is hydrogen or an alkyl radical containing 1 to 6 carbon atoms, $R_3$ and $R_4$ are bivalent paraffin radicals containing 1 to 3 carbon atoms, $R_5$ is an alkyl or cycloalkyl radical containing from 1 to 12 carbon atoms, and $n$ is an integer from 1 to 3.

Examples of alkyl 3-(3,4-methylenedioxybenzene) propyl sulfoxides includes ethyl 3-(3,4-methylenedioxybenzene)propyl sulfoxide and n-octyl 3-(3,4-methylenedioxybenzene)propyl sulfoxide.

Examples of substituted methylenedioxybenzenes include 1 - [2,5,8 - trioxadodecyl] - 2 - propyl - 4,5 - methylenedioxybenzene; and 1-[4,7,10-trimethyl-2,5,8,11-tetraoxanonadecyl] - 3 - n-propyl - 4,5 - methylenedioxybenzene.

The above synergistic materials are described more fully in Patent No. 2,884,355, issued April 28, 1959, to L. D. Goodhue and K. E. Cantrel.

The above synergistic materials may exhibit some repellent properties; however, they are not considered satisfactory repellents for most purposes and are herein distinguished from the repellent compositions per se by reference thereto as organic synergists.

The third active ingredient of this invention is a finely divided adsorbent material selected from the group consisting of silica gel, carbon black, activated charcoal, alumina gel, silica-alumina gel, montmorillonite (including bentonite, hectorite, and the like), attapulgite, and feldspar. The fact that these materials are all adsorbents is not to be considered tantamount to a statement that the adsorbent property is responsible for extending the repellency life of the insect repellents disclosed herein because the property which causes the beneficial result is not presently known. The finely divided adsorbents are preferably within the particle size range of about 1 to 10 microns and are usually employed in the amount of about 0.25 to about 4 parts per part by weight of repellent.

In addition to the polycyclic aldehydes and alcohols hereinbefore described, the following repellents can be employed in conjunction with the inorganic materials according to the method of this invention. One group of repellents includes the dialkyl esters of pyridine dicarboxylic acids of the formula

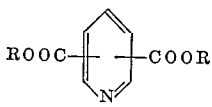

wherein each R is the same alkyl radical selected from the group consisting of ethyl, n-propyl and n-butyl. Some examples of compounds falling within the scope of this formula are di-n-propyl pyridine-2,5-dicarboxylate, di-ethyl pyridine-2,5-dicarboxylate, di-n-propyl pyridine-2,6-dicarboxylate, di-n-butyl pyridine-2,4-dicarboxylate, and the like. A more complete description of these repellents can be found in U.S. 2,757,120 of Leonard, issued July 31, 1956.

Still another group of repellents which can be employed in the compositions of this invention includes those of the formula

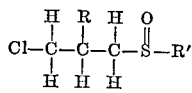

wherein R is selected from the group consisting of hydrogen and methyl and R′ is selected from the group consisting of normal, secondary and tertiary octyl groups. Compounds included within this formula are 3-chloropropyl n-octyl sulfoxide, 3-chloropropyl sec-octyl sulfoxide, 3-chloropropyl tert-octyl sulfoxide, 2-methyl-3-chloropropyl n-octyl sulfoxide, 2-methyl-3-chloropropyl sec-octyl sulfoxide and 2-methyl-3-chloropropyl tert-octyl sulfoxide. A more complete description of the sulfoxides of this invention is given in the copending application of R. E. Stansbury et al., Serial No. 733,834, filed May 8, 1958, now U.S. Patent 2,944,932.

Still another class of repellents which can be employed in the compositions of this inventtion includes those of the formula

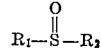

wherein $R_1$ is an unsaturated alicyclic or acyclic hydrocarbon radical having 3 to 10 carbon atoms and having one of an ethylenic and an acetylenic bond and wherein $R_2$ can be the same as $R_1$ and can be one of any saturated and unsaturated aliphatic and alicyclic organic radicals having 3 to 20 carbon atoms and $R_2$ in which a hydrogen atom is replaced by

and wherein the total number of carbon atoms in the compound is at least 6 and does not exceed 30. The preferred compounds falling within the scope of this formula are allyl n-octyl sulfoxide and methylallyl n-octyl sulfoxide. A description of these repllents and a complete list of specific examples of these repellents is given in the copending application of L. D. Goodhue et al., Serial No. 753,188, filed August 5, 1958, now U.S. Patent 3,000,779.

A still further class of repellents which can be employed in the composition of this invention includes those of the formula

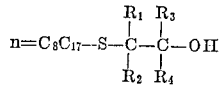

wherein $R_1$, $R_2$, $R_3$ and $R_4$ can be hydrogen, methyl, ethyl, propyl, isopropyl, or n-, iso- or tert-butyl radicals in any combination such that the total number of carbon atoms in $R_1$, $R_2$, $R_3$ and $R_4$ does not exceed 4. Some specific examples of compounds within this formula are 2-hydroxyethyl n-octyl sulfide, 2-hydroxypropyl n-octyl sulfide and 2-methyl-2-hydroxypropyl n-octyl sulfide. A more complete description of this class of repellents is given in U.S. 2,863,799 of L. D. Goodhue et al., issued December 9, 1958.

Still another class of repellents which can be employed in the compositions of this invention as repellents includes those of the formula

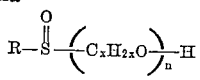

wherein R is a radical selected from the group consisting of alkyl, aryl, alkaryl, aralkyl, and cycloalkyl radicals containing from 4 to 16 carbon atoms, $x$ is an integer not less than 2 and ordinarily, though not necessarily, not greater than 5, and $n$ is an integer from 1 to 10. Some representative examples of compounds of this type are 2-hydroxyethyl n-octyl sulfoxide, 17-hydroxy-3,6,9,12,15-pentaoxaheptadecyl tert-dodecyl sulfoxide, 2-hydroxyethyl tert-nonyl sulfoxide, 2-hydroxyethyl tert-dodecyl sulfoxide, 8-hydroxy-3,6-dioxaoctyl tert-dodecyl sulfoxide, 2-hydroxyethyl n-butyl sulfoxide, and the like. A complete listing of the compounds within this general formula is given in the copending application of J. E. Mahan, Serial No. 679,054, filed August 19, 1957, now U.S. Patent 2,926,118.

Still another class of repellents which can be employed in the compositions of this invention includes those falling within the formula

wherein $R_3$ is an n-alkyl radical having 1 to 12 carbon atoms, $R_4$ is a radical selected from the group consisting of n- and sec-alkyl radicals having 1 to 8 carbon atoms, and wherein the total carbon atoms in $R_3$ and $R_4$ is in the range from 7–13 inclusive. Some specific examples of compounds falling within the scope of this formula are n-butyl n-propyl sulfoxide, n-octyl n-propyl sulfoxide and n-butyl n-hexyl sulfoxide. A more complete list of compounds of this type is given in the copending application of L. D. Goodhue et al., Serial No. 661,584, filed May 27, 1957, now U.S. Patent 2,957,799.

The organic synergists previously defined are preferably utilized in conjunction with the active repellent ingredient and the inorganic synergists or repellent life extenders; however, the inorganic synergists alone greatly extend the repellent life of the insect repellents disclosed herein and can be utilized alone with those repellents. The mechanism by which the repellent life of the active repellent ingredient is extended is not known although it is believed that the mechanism of repellent life increase bestowed upon the repellent by the compounds of U.S. Patent 2,884,355 differs from that of the finely divided inorganic materials of this invention because of the entirely different physical and chemical characteristics of the two classes of compounds.

It is possible, and sometimes desirable, to employ mixtures of two or more of the repellents from a single class or from different classes with one or both of the two classes of synergistic materials disclosed herein. Thus, the above-described repellents can be employed in conjunction with the inorganic synergists alone although it is preferred to utilize them in conjunction with one of the synergists disclosed in U.S. Patent 2,884,355.

The above-described repellents can simply be mixed with one or both of the classes of synergists described herein and employed in that form; however, it is usually preferred to suspend such mixture in a carrier for ease of application and efficient use of the repellent composition. The repellent compositions of this invention will usually be used in the form of emulsions comprising an oil phase, a water phase and an emulsifier, in addition to the repellent and synergist. The oil phase can be any hydrocarbon solvent which is not detrimental to the active repellent material. Some examples of materials which can be employed are: deodorized kerosene, benzene, toluene, isooctane, and the isoparaffinic hydrocarbons boiling between 250 and 800° F. which are prepared by the HF-catalyzed alkylation of isoparaffins with olefins and sold under the trademark Soltrols. Any emulsifying agent can be employed which does not adversely affect the repellent materials. One skilled in the art will experience no diffculty in selecting an emulsifying agent which will suit his particular requirements. Emulsifying agents such as sulfonated alkyl benzenes, alkylated aryl polyether alcohols such as Triton X–100; alkali metal alkyl aryl sulfonates such as sodium and potassium alkyl benzene sulfonates and potassium alkyl toluene sulfonates; sulfates of long-chain aliphatic alcohols such as sodium lauryl sulfates; water-soluble salts of organic bases containing a hydrocarbon chain of 8 to 24 carbon atoms, such as hydrochloric, sulfonic, formic, and acetic acid salts of primary, secondary, and tertiary amines such as octyl amines, dodecyl amines, octadecyl amines, and octadecenyl amines; the non-ionic emulsifying agents such as the condensation products of mercaptans with ethylene dioxide; sorbitan monolaurate; and sorbitan monolaurate polyoxyethylene derivatives such as Tween 20 can be used, as well as the Emcol H44C of Example I.

The compositions of this invention will contain repellent, organic synergists and inorganic synergists in the ratios from 0 to 20 parts by weight of organic synergist and from 0.2 to 10 parts by weight of inorganic synergist per part of repellent. When the repellent compositions are applied in inert carriers such as solvents, the repellent will be present in the composition in an amount within the range between 0.5 and 20 percent by weight based on the carrier.

The final composition of the emulsions of this invention will be within the following range:

REPELLENT COMPOSITION

|  | Weight percent |
|---|---|
| Oil | 5–20 |
| Organic synergist | 0–10 |
| Emulsifier | 1–5 |
| Repellent | 0.5–5 |
| Inorganic synergist | 1–5 |
| Water | 55–92.5 |

The ratio of the organic synergist to the repellent will be within the range of from 0 to 20:1, preferably from 5:1 to 1:1, both ratios being on a weight basis.

The method of formulating the emulsions of this invention has a direct bearing on the effectiveness of the composition. The preferred method is to dissolve the organic synergist, the emulsifier and the repellent in the oil, slurry the inorganic synergist in the water, and then emulsify the two phases together.

After the composition is formulated, the emulsion can be applied to surfaces from which it is desired to repel insects by such methods as spraying, dipping, brushing, and the like. It is generally advantageous to apply a sufficient amount of the repellent composition to the surface to be treated so as to deposit from 1 to 500 grams of the repellent per 100 square feet of surface.

The following specific examples clearly demonstrate the effectiveness of the repellent compositions of this invention. However, it is not intended that the invention be limited to the specific embodiments shown therein.

*Example I*

A number of runs were carried out in which mixtures of 2,3,4,5-bis-($\Delta^2$-butenylene)tetrahydrofurfural and N-octyl bicyclo [2.2.1]-5-heptene-2,3-dicarboximide were tested alone and in mixtures with finely divided silica gel as repellents for roaches.

In these tests, one part by weight of a concentrate which contained 68 percent by weight deodorized kerosene, 15 percent by weight N-2-ethylhexyl bicyclo[2.2.1]-5-heptene-2,3-dicarboximide, 5 percent by weight 2,3,4,5-bis-($\Delta^2$-butenylene)tetrahydrofurfural and 12 percent by weight of a non-ionic detergent sold under the trade name of Emcol H44C by the Emulsol Corporation of Chicago, Illinois, was mixed with 4 parts by weight of an aqueous slurry containing 2.5 weight percent of a silica gel of 3–5 micron particle size, or in a control run, 4 parts of water.

The thus-prepared emulsions, containing 1 percent by weight 2,3,4,5 - bis($\Delta^2$-butenylene)tetrahydrofurfural, 3 percent by weight N-2-ethylhexyl bicyclo[2.2.1]-5-heptene-2,3-dicarboxide, and 0 or 2 percent by weight silica gel, were then applied to file cards, 3″ x 5″. A total of five cards, including one untreated check, were placed in clear plastic cages, 8″ x 8″ x 12″, fitted with a screened top, and containing approximately 500 German roaches. The cards were placed so as to lean against the sides of the cage. If all five cards were nonrepellent, each card would thus have approximately 100 roaches on it, since these roaches crawl up on the cards. In these tests, wherein only one card was nonrepellent at the beginning of the test, the check contained about 150 roaches.

Prior to introduction of the cards, the cards were treated with the emulsions by dipping the card in five cc. of the liquid, and hung up in the laboratory for one week. The cards were then introduced and six counts of the roaches on each card were made at one-hour intervals. The cards were then removed and aged another week and again exposed to the roaches. The procedure was repeated at the end of the third and fourth weeks, at which time the tests were discontinued. The percent repellency at the end of each week was calculated by the following formula:

Percent repellency = 100
$$\frac{\text{Total roaches on treated card} \times 100}{\text{Total roaches on untreated card}}$$

The results of these tests are expressed below as Table I.

TABLE I

| Aging Time: | Percent Repellency | | |
|---|---|---|---|
| | 0% A,[1] 0% B, 2% C | 1% A, 3% B, 0% C | 1% A, 3% B, 2% C |
| 1 week | 14 | 71 | 95 |
| 2 weeks | 0 | 40 | 97 |
| 3 weeks | 0 | [2] negative | 81 |
| 4 weeks | 0 | 11 | 80 |

[1] A=2,3,4,5-bis($\Delta^2$-butenylene)tetrahydrofurfural. B=N-2-ethylhexyl bicyclo[2.2.1]-5-heptene-2,3-dicarboximide. C=finely divided silica gel.
[2] More roaches were present on the treated card than the untreated check.

In these tests, the silica gel was added by adding it to the water used to emulsify oil containing the other ingredients. When the dry silica gel was added to the oil phase, it was much less effective.

*Example II*

Still another series of tests was carried out in which the repellent compositions of the invention were tested as repellents for roaches. These tests were carried out by exactly the same procedure employed in Example I except that the cards were not hung up for one week prior to testing. The compositions on the cards were made by formulating one part which contained 5% by weight of the repellent to be tested, 15% by weight of N-2-ethylhexyl bicyclo[2.2.1]-5-heptene-2,3-dicarboximide (organic synergist) and 12% by weight of a non-ionic detergent sold under the trade name of Emcol H44C by the Emulsol Corporation of Chicago, Illinois, dissolved in deodorized kerosene, and then shaking the part with 4 parts of water containing 2.5 weight percent of silica gel dispersed in it. The resulting formulation thus contained—

REPELLENT COMPOSITIONS

| Ingredient: | Weight percent |
|---|---|
| Repellent | 1.0 |
| N-2-ethylhexyl bicyclo[2.2.1]-5-heptene-2,3-dicarboximide | 3.0 |
| Emulsifier | 2.4 |
| Silica gel | 0 or 2.0 |
| Water | 78.0 or 80 |
| Oil | 13.6 |

The results of these tests are expressed below:

TABLE II

| Repellent | Amount of Silica Gel, Weight Percent | Percent Repellency | | | |
|---|---|---|---|---|---|
| | | 1st Day | 7th Day | 14th Day | 21st Day |
| 3-chloropropyl n-octyl sulfoxide | 0 | 82 | 66 | 54 | 51 |
| Do | 2.0 | 99 | 80 | 63 | 59 |
| 2-hydroxyethyl n-octyl sulfide | 0 | 83 | 47 | 65 | 59 |
| Do | 2.0 | 99 | 92 | 86 | 75 |

*Example III*

Still another series of runs was carried out in which a repellent, 2-hydroxyethyl n-octyl sulfide, was tested in the presence and absence of finely divided adsorbents. These tests were carried out by exactly the same procedure described in Example II. The formulation applied to the cards was as follows.

REPELLENT COMPOSITIONS

| Ingredient: | Weight percent |
|---|---|
| 2-hydroxyethyl n-octyl sulfide | 1.0 |
| N-2-ethylhexyl bicyclo[2.2.1]-5-heptene-2,3-dicarboximide | 3.0 |
| Emulsifier | 2.4 |
| Adsorbent | 0 to 2.0 |
| Water | 78.0 or 80 |
| Deodorized kerosene | 13.6 |

The results of these tests are expressed below:

TABLE III

| Adsorbent Used | Weight Percent Adsorbent | Percent Repellency | | |
|---|---|---|---|---|
| | | 1st Day | 7th Day | 14th Day |
| None | 0 | 73 | 62 | 62 |
| Bentonite | 2 | 97 | 79 | 86 |
| Alumina | 2 | 95 | 75 | 66.5 |
| Carbon black | 2 | 98 | 82 | 70.5 |
| None | 0 | 78 | 76 | 58 |
| Silica gel | 2 | 99.8 | 99 | 98 |

That which is claimed is:

1. An insect repellent composition containing as essential active ingredients about 1 part by weight of 2,3,4,5-bis($\Delta^2$-butenylene)tetrahydrofurfural; about 1 to about 5 parts by weight of N-2-ethylhexyl bicyclo[2.2.1]-5-heptene-2,3-dicarboximide; and about 0.2 to about 10 parts by weight of silica gel having a particle size in the range of about 1 to about 10 microns.

2. An insect repellent containing as essential active ingredients about 1 part by weight of a repellent compound selected from the group 2,3,4,5-bis($\Delta^2$-butenylene)-tetrahydrofurfural, 3-chloropropyl n-octyl sulfoxide and 2 hydroxyethyl n-octyl sulfide together with 0 to about 20 parts by weight of N-2-ethylhexyl bicyclo[2.2.1]-5-heptene-2,3-dicarboximide and about 0.2 to about 10 parts by weight of a material selected from the group consisting of silica gel, carbon black and bentonite.

3. The repellent composition of claim 2 wherein the repellent compound is 2,3,4,5-bis($\Delta^2$-butenylene)tetrahydrofurfural.

4. The repellent composition of claim 2 wherein the repellent compound is 3-chloropropyl n-octyl sulfoxide.

5. The repellent composition of claim 2 wherein the repellent compound is n-octyl n-propyl sulfoxide.

6. The repellent composition of claim 2 wherein the repellent compound is 2-hydroxyethyl n-octyl sulfide.

7. The repellent composition of claim 2 wherein said material is silica gel.

References Cited in the file of this patent

UNITED STATES PATENTS

| | | |
|---|---|---|
| 2,683,151 | Hillyer | July 6, 1954 |
| 2,687,419 | Hillyer | Aug. 24, 1954 |
| 2,757,120 | Leonard | July 31, 1956 |
| 2,795,592 | Hillyer | June 11, 1957 |
| 2,824,822 | Goodhue | Feb. 25, 1958 |
| 2,863,799 | Goodhue | Dec. 9, 1958 |
| 2,884,355 | Goodhue | Apr. 28, 1959 |
| 2,946,717 | Cantrel | July 26, 1960 |

OTHER REFERENCES

King: U.S. Dept. Agr. Handbook No. 69, May 1954, p. 46 (item No. 872).

Frear: Chemistry of Insecticides, Fungicides and Herbicides, 2nd ed., 1948, pp. 51, 286, 287.